(12) United States Patent
Patnala et al.

(10) Patent No.: US 10,752,197 B2
(45) Date of Patent: Aug. 25, 2020

(54) INSTRUMENT PANEL WITH PASSENGER AIRBAG

(71) Applicant: Ford Global Technologies, LLC, Dearborn, MI (US)

(72) Inventors: Manoj Patnala, Canton, MI (US); Nicholas Andrew Mazzocchi, Ann Arbor, MI (US); Alan Perelli, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 183 days.

(21) Appl. No.: 15/953,655

(22) Filed: Apr. 16, 2018

(65) Prior Publication Data
US 2019/0315301 A1    Oct. 17, 2019

(51) Int. Cl.
| | | |
|---|---|---|
| *B60R 21/205* | (2011.01) | |
| *B60R 13/02* | (2006.01) | |
| *B60R 21/2165* | (2011.01) | |
| *B60R 21/215* | (2011.01) | |

(52) U.S. Cl.
CPC ........ *B60R 21/205* (2013.01); *B60R 13/0256* (2013.01); *B60R 21/2165* (2013.01); *B60R 2021/21537* (2013.01)

(58) Field of Classification Search
CPC .............. B60R 21/205; B60R 21/2165; B60R 13/0256; B60R 2021/21537
See application file for complete search history.

(56) References Cited

U.S. PATENT DOCUMENTS

| | | | |
|---|---|---|---|
| 5,810,388 A | 9/1998 | Berardi et al. | |
| 6,076,851 A | 6/2000 | Davis, Jr. et al. | |
| 6,092,835 A | 7/2000 | Thakore et al. | |
| 6,595,543 B2 * | 7/2003 | Desprez | B60R 21/2165 280/728.2 |
| 6,623,029 B2 | 9/2003 | Sun et al. | |
| 6,644,685 B2 | 11/2003 | Sun et al. | |
| 7,178,825 B2 * | 2/2007 | Fujii | B60R 21/2155 280/728.3 |
| 7,234,726 B2 | 6/2007 | Trevino et al. | |
| 7,237,797 B2 | 7/2007 | Dailey et al. | |
| 7,422,232 B2 | 9/2008 | Cowelchuk et al. | |
| 7,464,958 B2 | 12/2008 | Kong | |
| 7,594,674 B1 | 9/2009 | Biondo et al. | |
| 7,615,177 B2 | 11/2009 | Izumi et al. | |

(Continued)

FOREIGN PATENT DOCUMENTS

| | | |
|---|---|---|
| JP | 2000071914 A | 3/2000 |
| JP | 4832052 B2 | 12/2011 |

(Continued)

OTHER PUBLICATIONS

Non-Final Office Action dated Sep. 9, 2019 for U.S. Appl. No. 15/953,936 (18 pages).

*Primary Examiner* — Drew J Brown
(74) *Attorney, Agent, or Firm* — Frank A. MacKenzie; Bejin Bieneman PLC

(57) ABSTRACT

An instrument panel includes a housing and an airbag. The housing includes a chute elongated to an end and a door at least partially covering the end of the chute. The airbag is disposed in the chute. The housing includes a first ridge elongated along a perimeter of the end of the chute and a second ridge elongated along a perimeter of the door.

16 Claims, 5 Drawing Sheets

(56) References Cited

U.S. PATENT DOCUMENTS

| | | |
|---|---|---|
| 7,740,269 B2 | 6/2010 | Kang |
| 7,828,323 B1 * | 11/2010 | Mazzocchi ............ B60R 21/215 |
| | | 156/73.5 |
| 7,976,057 B2 | 7/2011 | Evans et al. |
| 8,336,906 B2 | 12/2012 | Kim et al. |
| 8,336,908 B1 | 12/2012 | Kalisz et al. |
| 8,403,357 B2 | 3/2013 | Choi |
| 8,469,393 B1 * | 6/2013 | Siewert ................. B60R 21/215 |
| | | 280/728.3 |
| 8,511,706 B2 | 8/2013 | Kalisz |
| 8,870,219 B1 | 10/2014 | Roy et al. |
| 9,022,419 B2 | 5/2015 | Pauthier et al. |
| 9,193,141 B2 | 11/2015 | Evans |
| 9,975,514 B1 | 5/2018 | Simon |
| 10,220,807 B2 | 3/2019 | Mazzocchi et al. |
| 10,377,336 B2 | 8/2019 | Lu et al. |
| 2004/0026902 A1 | 2/2004 | Yasuda et al. |
| 2005/0167953 A1 | 8/2005 | Weissert |
| 2006/0131844 A1 * | 6/2006 | Trevino .............. B60R 21/2165 |
| | | 280/728.3 |
| 2006/0267314 A1 | 11/2006 | Yasuda et al. |
| 2007/0040360 A1 | 2/2007 | Riha et al. |
| 2008/0012273 A1 * | 1/2008 | Cowelchuk ......... B60R 21/2165 |
| | | 280/728.3 |
| 2012/0068441 A1 * | 3/2012 | Kalisz ................. B60R 21/2165 |
| | | 280/728.3 |
| 2012/0139213 A1 * | 6/2012 | Iseman ............... B60R 21/2165 |
| | | 280/728.3 |
| 2016/0075301 A1 * | 3/2016 | Kwasnik ............. B60R 21/2165 |
| | | 280/728.3 |
| 2018/0201218 A1 * | 7/2018 | Zhang .................... B29C 69/00 |
| 2018/0272983 A1 * | 9/2018 | Mazzocchi ........... B60R 21/215 |
| 2018/0281729 A1 * | 10/2018 | Asakuma ............... B23K 26/21 |

FOREIGN PATENT DOCUMENTS

| | | |
|---|---|---|
| JP | 5149708 B2 | 2/2013 |
| KR | 101606477 B1 | 3/2016 |
| KR | 101607450 B1 | 3/2016 |

* cited by examiner

INSTRUMENT PANEL WITH PASSENGER AIRBAG

BACKGROUND

Vehicles are equipped with airbags. In the event of an impact, an inflator activates and provides inflation medium to the airbags, and the airbags pressurize and act as cushions for occupants during the impact. The airbags are located at various fixed positions in passenger cabins of vehicles. Vehicles typically include a driver airbag mounted in the steering wheel, a passenger airbag mounted in the instrument panel in a vehicle-forward direction from the front passenger seat, and side air curtains mounted in the roof rails.

DETAILED DESCRIPTION

Figure 1:
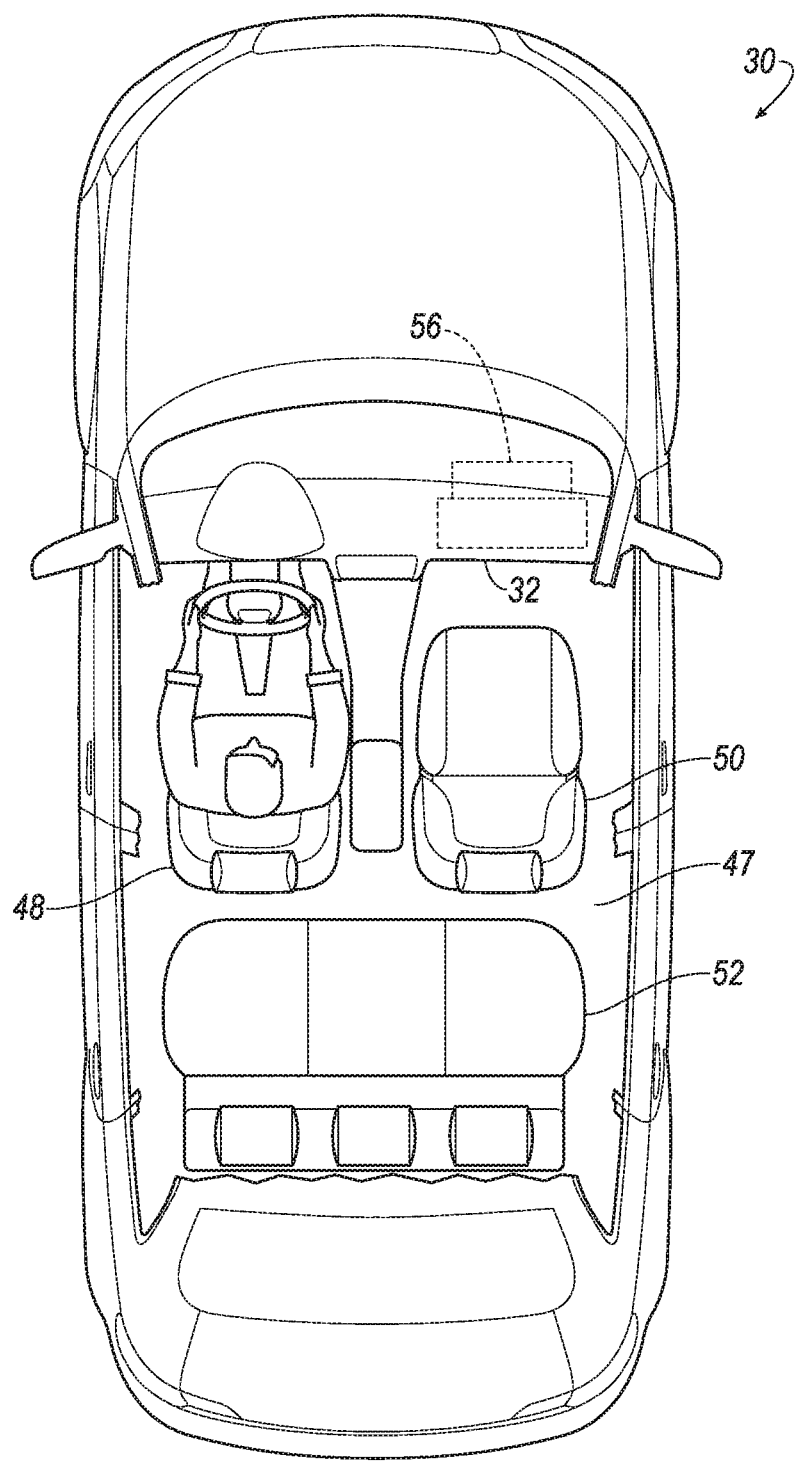
FIG. 1 is a top view of a passenger cabin of a vehicle.

An instrument panel includes a housing including a chute elongated to an end and a door at least partially covering the end of the chute, and an airbag disposed in the chute. The housing includes a first ridge elongated along a perimeter of the end of the chute and a second ridge elongated along a perimeter of the door.

The housing may include a hinge connecting the door and the chute and elongated along the perimeter of the end of the chute. The hinge may have an S-shaped cross-section.

The first ridge may be elongated along more than half of the perimeter of the end of the chute, and the second ridge may be elongated along more than half of the perimeter of the door.

The door and the end of the chute may define a gap therebetween. The gap may have a substantially constant width along the perimeter of the end of the chute.

The housing may include a hinge connecting the door and the chute, and the hinge and the gap in combination may be elongated along substantially all the perimeter of the end of the chute.

The first ridge and the second ridge may be elongated along substantially all the gap. The first ridge may be elongated along the gap from a first end beyond the gap to a second end beyond the gap, and the second ridge may be elongated along the gap from a first end beyond the gap to a second end beyond the gap. The first end of the first ridge may be closer to the first end than the second end of the second ridge; the second end of the first ridge may be closer to the second end than the first end of the second ridge; the first end of the first ridge may be offset along the perimeter of the end of the chute from the first end of the second ridge; and the second end of the first ridge may be offset along the perimeter from the second end of the second ridge.

The gap may be elongated from a first end to a second end; the first end of the first ridge and the first end of the second ridge may be curved around the first end of the gap; and the second end of the first ridge and the second end of the second ridge may be curved around the second end of the gap.

The first ends of the first ridge and the second ridge may contact each other, and the second ends of the first ridge and the second ridge may contact each other.

The instrument panel may further include a substrate; and the housing may be attached to the substrate; and the substrate includes a slot elongated along the gap.

The housing may be a single piece.

The housing may include a flange extending outward from the chute. The instrument panel may further include a substrate, and the door and the flange may be attached to the substrate.

The instrument panel may further include a substrate, and the housing may be attached to the substrate. The housing may be friction welded to the substrate.

The instrument panel may further include a covering and a foam layer between the substrate and the covering; and the substrate may have an outer surface and an inner surface; and the housing may be attached to the inner surface.

With reference to the Figures, an instrument panel 32 in a vehicle 30 includes a housing 56 and an airbag 66. The housing 56 includes a chute 44 elongated to an end 46 and a door 58 at least partially covering the end 46 of the chute 44. The airbag 66 is disposed in the chute 44. The housing 56 includes a first ridge 72 elongated along a perimeter of the end 46 of the chute 44 and a second ridge 74 elongated along a perimeter of the door 58. (The adjectives "first" and "second" are used throughout this document as identifiers and are not intended to signify importance or order.)

The instrument panel 32 may be a foam-in-place instrument panel, and the design of the instrument panel 32 allows for bottom-up installation of the chute 44. The chute 44 allows for a larger airbag 66, both laterally and longitudinally, than other designs while still deploying the airbag 66 sufficiently quickly and cleanly along a score line 94 of the covering 40. The bottom-up installation allows walls of the chute 44 to be thicker and stiffer, which concentrates the force of the airbag 66 against the door 58 during inflation. Because of the concentrated inflation force from the airbag 66, the instrument panel 32 experiences reduced foam fragmentation, more consistent opening of the instrument panel 32, improved turtle necking, and design freedom to use any of multiple types of scoring techniques on the covering 40.

With reference to FIG. 1, the vehicle 30 includes a passenger cabin 47 to house occupants, if any, of the vehicle 30. The passenger cabin 47 includes a driver seat 48 and a passenger seat 50 disposed at a front of the passenger cabin 47 and one or more back seats 52 disposed behind the driver seat 48 and passenger seat 50. The passenger cabin 47 may also include third-row seats (not shown) at a rear of the passenger cabin 47. In FIG. 1, the driver seat 48 and passenger seat 50 are shown to be bucket seats, but the seats 48, 50, 52 may be other types. The position and orientation of the seats 48, 50, 52 and components thereof may be adjustable by an occupant.

The instrument panel 32 may be disposed at a forward end of the passenger cabin 47 and face toward the driver seat 48 and passenger seat 50. The instrument panel 32 may include vehicle controls, such as a steering wheel; gauges, dials, and information displays; heating and ventilation equipment; a radio and other electronics; etc. As described below, the instrument panel 32 may be a foam-in-place instrument panel, i.e., assembled by injecting the foam layer 42 between the substrate 34 and the covering 40.

Figure 2:
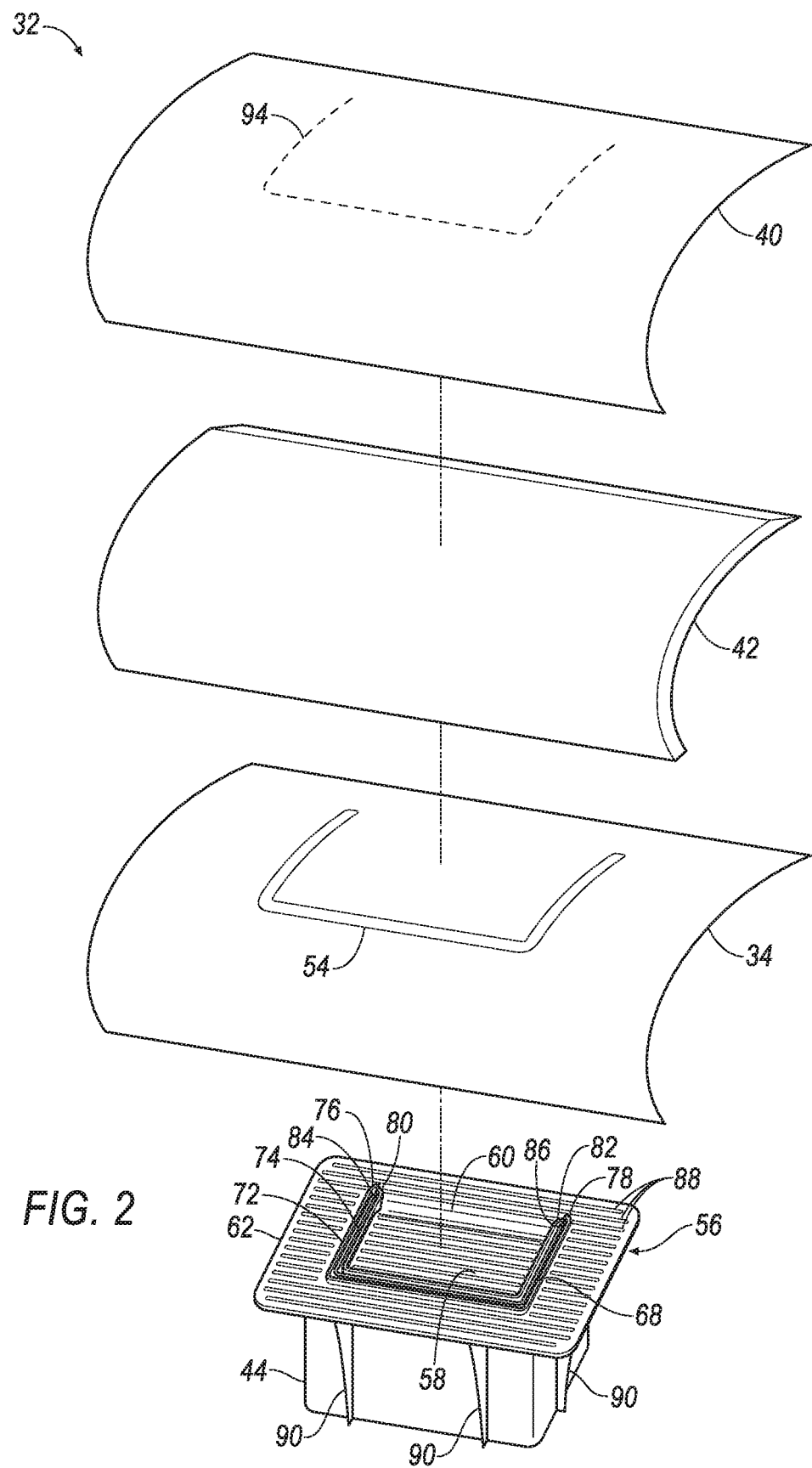
FIG. 2 is an exploded perspective view of an instrument panel of the passenger cabin of FIG. 1.
Figure 3:
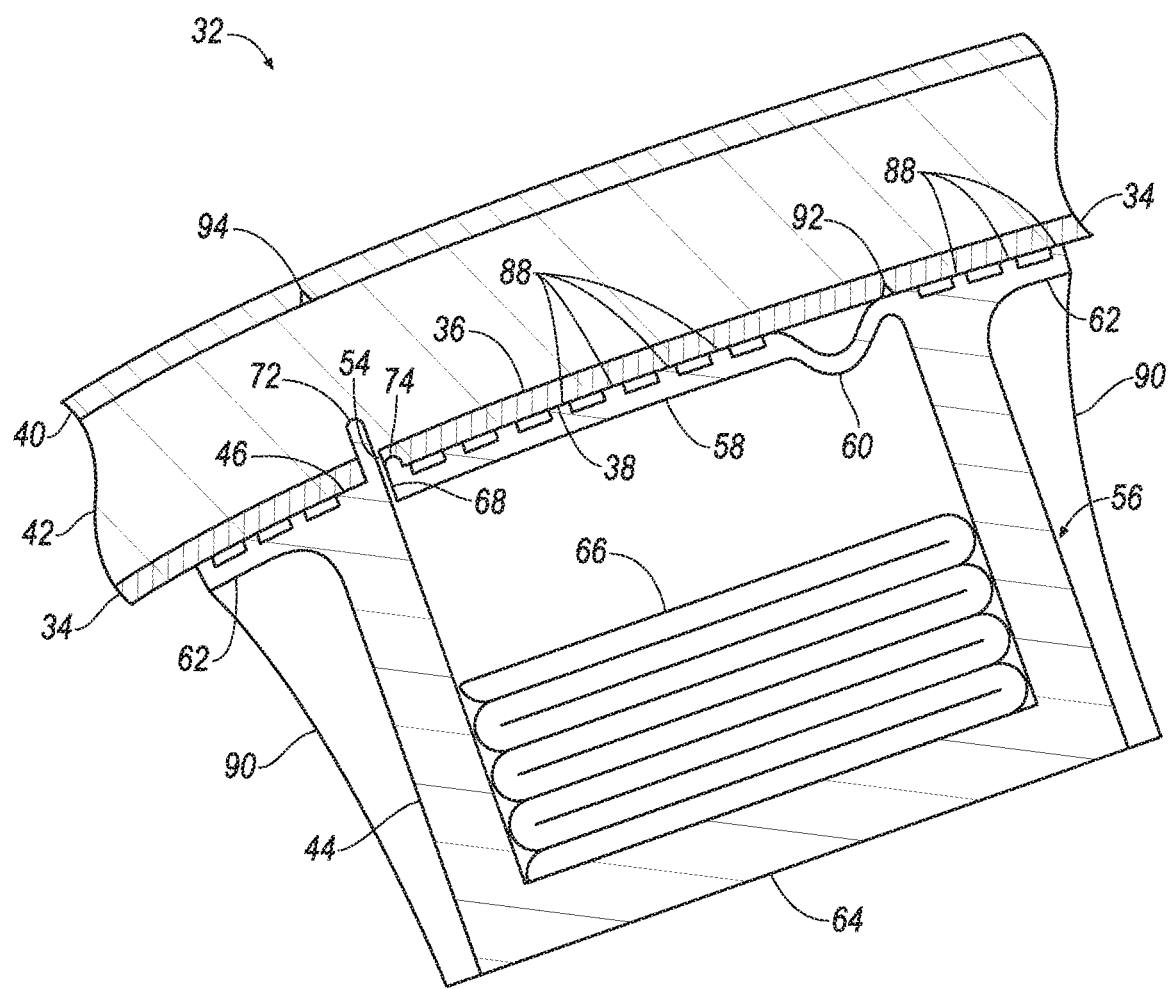
FIG. 3 is a cross-sectional view of the instrument panel of FIG. 2 with an airbag in an uninflated position.

With reference to FIGS. 2 and 3, the instrument panel 32 includes the substrate 34. The substrate 34 is elongated laterally, i.e., in a vehicle-crosswise-direction, across the passenger cabin 47 and curved along a longitudinal direction, i.e., a vehicle-forward direction. The outer surface 36 of the substrate 34 faces the passenger cabin 47, and the inner surface 38 faces away from the passenger cabin 47. The outer surface 36 is a concave side of the substrate 34, and the inner surface 38 is a convex side of the substrate 34. The substrate 34 may be a plastic and/or a composite, e.g., glass-filled polypropylene.

The substrate 34 includes a slot 54. The slot 54 may be U-shaped; more specifically, a portion of the slot 54 may be elongated laterally, and two portions may be elongated longitudinally, i.e., in a vehicle-forward direction, from ends of the laterally elongated portion of the slot 54. The slot 54 may have a constant width along its length. The substrate 34 may include a notch 92 elongated between ends of the slot 54. The notch 92 may be a weakened area, e.g., of less thickness than surrounding areas. The notch 92 may be formed as the substrate 34 is formed by injection molding, or the notch 92 may be formed by laser weakening a portion of the substrate 34 after formation.

The foam layer 42 is disposed between the substrate 34, e.g., the outer surface 36, and the covering 40. The foam layer 42 may be, e.g., polyurethane in a foamlike structure, i.e., with empty cells dispersed throughout.

The covering 40 extends over the outer surface 36 of the substrate 34 and over the foam layer 42. The covering 40 may be a material that is aesthetically pleasing to occupants, e.g., leather. The covering 40 may include the score line 94, i.e., a weakened area that will be opened by an airbag 66 inflating.

A housing 56 includes the chute 44, a door 58, a hinge 60 connecting the door 58 to the chute 44, and a flange 62. The housing 56 may be integral, i.e., may be a single piece, i.e., may be made of a single, uniform piece of material with no seams, joints, fasteners, or adhesives holding the housing 56 together. The housing 56 may be positioned in front of, i.e., in a vehicle-forward direction from, the passenger seat 50.

The chute 44 has a tubular shape that is elongated from a bottom panel 64 to the end 46. The chute 44 may have a rectangular cross-sectional shape, e.g., with rounded corners. The bottom panel 64 may be closed, and the end 46 may be open. An inside lateral cross-sectional width of the chute 44 may be approximately equal to a lateral length of the slot 54, and an inside longitudinal cross-sectional width of the chute 44 may be approximately equal to a longitudinal length of the slot 54. An outside lateral cross-sectional width of the chute 44 may be longer than the lateral length of the slot 54, and an outside longitudinal cross-sectional width of the chute 44 may be longer than the longitudinal length of the slot 54. Moreover, the chute 44 may include stiffeners 90 elongated from the bottom panel 64 to the end 46, and the stiffeners 90 extend further outside the lateral and longitudinal length of the slot 54. At least some of a perimeter of the end 46 of the chute 44 is elongated along the slot 54. The slot 54, e.g., an entire length of the slot 54, is elongated along the perimeter of the end 46 of the chute 44. The slot 54 may be elongated along the perimeter of the end 46 of the chute 44 away from the hinge 60.

Figure 4:
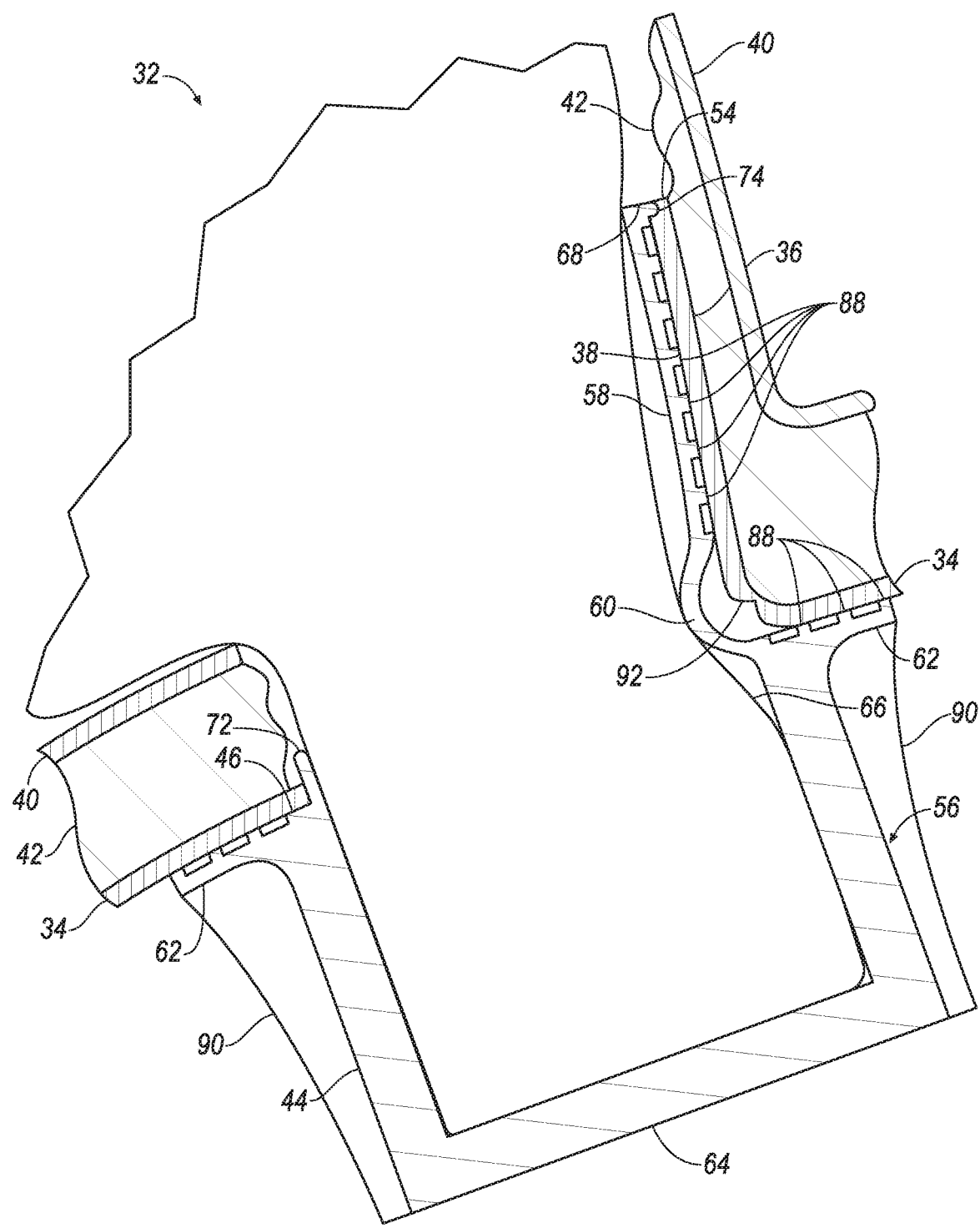
FIG. 4 is a cross-sectional view of the instrument panel of FIG. 2 with the airbag in an inflated position.

The airbag 66 is disposed in the chute 44. The airbag 66 may be a passenger airbag. The airbag 66 may be sized to cushion an occupant of the passenger seat 50 during a frontal impact to the vehicle 30. The airbag 66 is inflatable from an uninflated position, as shown in FIG. 3, to an inflated position, as shown in FIG. 4.

The flange 62 extends outward from the chute 44. Specifically, the flange 62 extends outward from the perimeter of the end 46. The flange 62 faces the substrate 34 and may be shaped to conform to the substrate 34.

The door 58 at least partially covers the end 46 of the chute 44. The door 58 is adjacent to the substrate 34. One side of the door 58 faces the substrate 34, and the other side of the door 58 faces the airbag 66.

The hinge 60 connects the door 58 to the end 46 of the chute 44. The hinge 60 is elongated along some of the perimeter of the end 46 of the chute 44; e.g., the hinge 60 may be elongated along a section of the perimeter of the end 46 of the chute 44 along which the slot 54 is not elongated. The hinge 60 may be elongated along the notch 92. The hinge 60 may be connected to a vehicle-forward edge of the door 58. The hinge 60 has an S-shaped cross-section, i.e., a cross-section following at least two curves turning opposite directions, i.e., a cross-section following at least two curves with concave sides facing opposite directions.

The door 58 and the end 46 of the chute 44 define a gap 68 therebetween. The gap 68 may be elongated along the perimeter of the end 46 of the chute 44. The gap 68 may be elongated along substantially all the slot 54. The hinge 60 and the gap 68 in combination may be elongated along substantially all the perimeter of the end 46 of the chute 44. The gap 68 may have a substantially constant width along its length.

The housing 56 is attached to the substrate 34. For example, the flange 62 and/or the door 58 are attached to the inner surface 38 of the substrate 34. The flange 62 and/or the door 58 may be directly attached to the substrate 34 in any suitable manner, e.g., adhesion, fastening, welding, etc. For example, the flange 62 and/or the door 58 may be friction-welded to the inner surface 38 of the substrate 34, i.e., may have a boundary between the substrate 34 and the flange 62 and/or between the substrate 34 and the door 58 melted together so that the molecules intermingle across the boundary. The flange 62 and/or the door 58 may include ribs 88 at which the friction welding has occurred. The chute 44 may be attached, e.g., friction-welded, to the substrate 34 via the flange 62 and/or the door 58.

Figure 5:
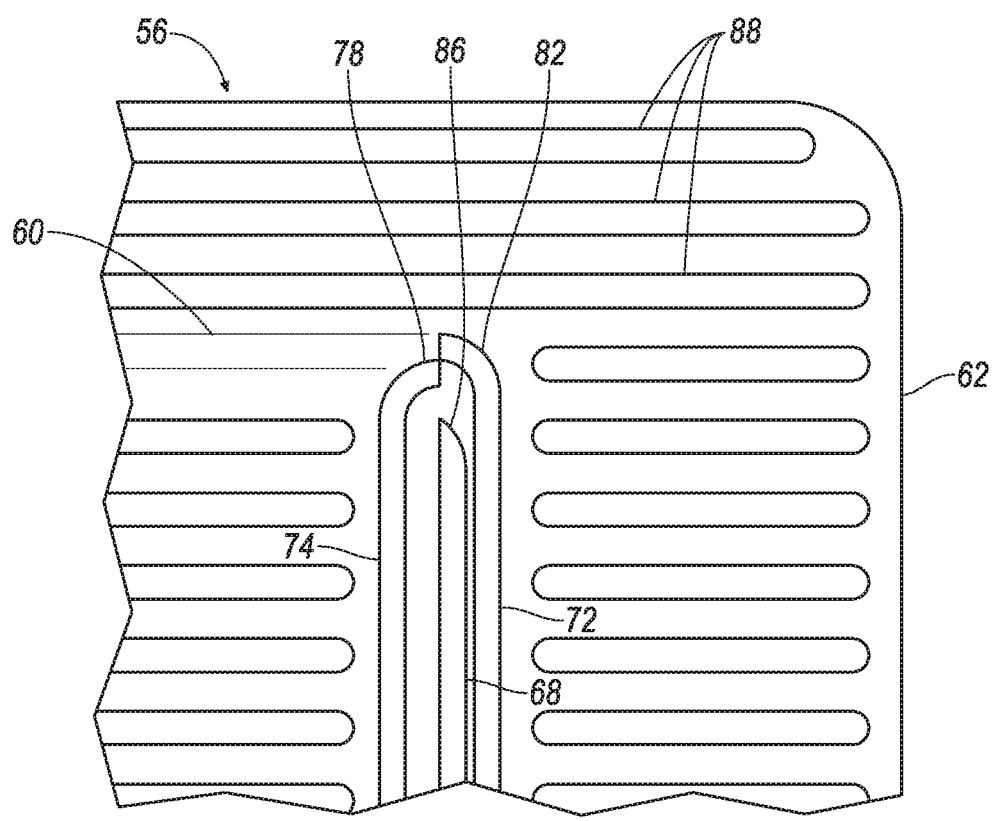
FIG. 5 is a plan view of a portion of a housing of the instrument panel of FIG. 2.

With reference to FIGS. 2 and 5, the housing 56 includes the first ridge 72 elongated along the perimeter of the end 46 of the chute 44. The first ridge 72 extends from the end 46 of the chute 44 toward and possibly past the substrate 34. The first ridge 72 may be elongated along more than half of the perimeter of the end 46 of the chute 44 and along substantially all the gap 68 and all the slot 54. The first ridge 72 is elongated from a first end 76 beyond the gap 68 to a second end 78 beyond the gap 68; in other words, the first ridge 72 is at least slightly longer than the gap 68.

The housing includes 56 the second ridge 74 elongated along the perimeter of the door 58. The second ridge 74 extends from the door 58 toward the substrate 34. The second ridge 74 may be elongated along more than half of the perimeter of the door 58 and along substantially all the gap 68 and all the slot 54. The second ridge 74 is elongated from a first end 80 beyond the gap 68 to a second end 82 beyond the gap 68; in other words, the second ridge 74 is at least slightly longer than the gap 68. The ridges 72, 74 help prevent foam and other debris from entering the gap 68.

The first end 76 of the first ridge 72 is closer to the first end 80 than the second end 82 of the second ridge 74, and the second end 78 of the first ridge 72 is closer to the second end 82 than the first end 80 of the second ridge 74; in other words, the first ends 76, 80 of the ridges 72, 74 are next to each other, and the second ends 78, 82 of the ridges 72, 74 are next to each other. The first ends 76, 80 may contact each other, and the second ends 78, 82 may contact each other, thus preventing the foam layer 42 from intruding into the gap 68 during assembly. The gap 68 is elongated from a first end 84 to a second end 86, and the first ends 76, 80 of the ridges 72, 74 are next to the first end 84 of the gap 68, and the second ends 78, 82 of the ridges 72, 74 are next to the second end 86 of the gap 68.

The first end 76 of the first ridge 72 and the first end 80 of the second ridge 74 are curved around the first end 84 of the gap 68, and the second end 78 of the first ridge 72 and the second end 82 of the second ridge 74 are curved around the second end 86 of the gap 68. The first end 76 of the first ridge 72 is offset along the perimeter of the end 46 of the chute 44 from the first end 80 of the second ridge 74, and the second end 78 of the first ridge 72 is offset along the perimeter from the second end 82 of the second ridge 74. The first ridge 72 may be longer than the second ridge 74.

With reference to FIG. 4, in the event of, e.g., an impact to the vehicle 30, the airbag 66 inflates. As the airbag 66 inflates, the airbag 66 pushes against the chute 44 and the door 58. The stiffness of the chute 44 concentrates the force of the airbag 66 against the door 58. The S-shaped cross-section of the hinge 60 allows the hinge 60 to bend and the door 58 to rotate open relative to the chute 44. The offsets of the first ends 76, 80 and of the second ends 78, 82 of the ridges 72, 74 allow the door 58 to open without having to bend or break through the ridges 72, 74, which are thicker than the width of the door 58. The door 58 breaks through the foam layer 42 and the covering 40, and the airbag 66 expands in front of an occupant of the passenger seat 50. The airbag 66 cushions the occupant and may reduce injury.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An instrument panel comprising:
a housing including a chute elongated to an end and a door at least partially covering the end of the chute; and
an airbag disposed in the chute;
wherein the housing includes a first ridge elongated along a perimeter of the end of the chute and a second ridge elongated along a perimeter of the door;
the door and the end of the chute define a gap therebetween;
the first ridge and the second ridge are elongated along substantially all the gap;
the first ridge is elongated along the gap from a first end beyond the gap to a second end beyond the gap; and
the second ridge is elongated along the gap from a first end beyond the gap to a second end beyond the gap.

2. The instrument panel of claim 1, wherein the housing includes a hinge connecting the door and the chute and elongated along the perimeter of the end of the chute.

3. The instrument panel of claim 2, wherein the hinge has an S-shaped cross-section.

4. The instrument panel of claim 1, wherein the first ridge is elongated along more than half of the perimeter of the end of the chute, and the second ridge is elongated along more than half of the perimeter of the door.

5. The instrument panel of claim 1, wherein the gap has a substantially constant width along the perimeter of the end of the chute.

6. The instrument panel of claim 1, wherein the housing includes a hinge connecting the door and the chute, and the hinge and the gap in combination are elongated along substantially all the perimeter of the end of the chute.

7. The instrument panel of claim 1, wherein the first end of the first ridge is closer to the first end of the second ridge than the second end of the second ridge, the second end of the first ridge is closer to the second end of the second ridge than the first end of the second ridge, the first end of the first ridge is offset along the perimeter of the end of the chute from the first end of the second ridge, and the second end of the first ridge is offset along the perimeter from the second end of the second ridge.

8. The instrument panel of claim 1, wherein the gap is elongated from a first end to a second end, the first end of the first ridge and the first end of the second ridge are curved around the first end of the gap, and the second end of the first ridge and the second end of the second ridge are curved around the second end of the gap.

9. The instrument panel of claim 1, wherein the first ends of the first ridge and the second ridge contact each other, and the second ends of the first ridge and the second ridge contact each other.

10. The instrument panel of claim 1, further comprising a substrate, wherein the housing is attached to the substrate, and the substrate includes a slot elongated along the gap.

11. The instrument panel of claim 1, wherein the housing is a single piece.

12. The instrument panel of claim 1, wherein the housing includes a flange extending outward from the chute.

13. The instrument panel of claim 12, further comprising a substrate, wherein the door and the flange are attached to the substrate.

14. The instrument panel of claim 1, further comprising a substrate, wherein the housing is attached to the substrate.

15. The instrument panel of claim 14, wherein the housing is friction welded to the substrate.

16. The instrument panel of claim 14, further comprising a covering and a foam layer between the substrate and the covering, wherein the substrate has an outer surface and an inner surface, and the housing is attached to the inner surface.

* * * * *